Patented May 19, 1931

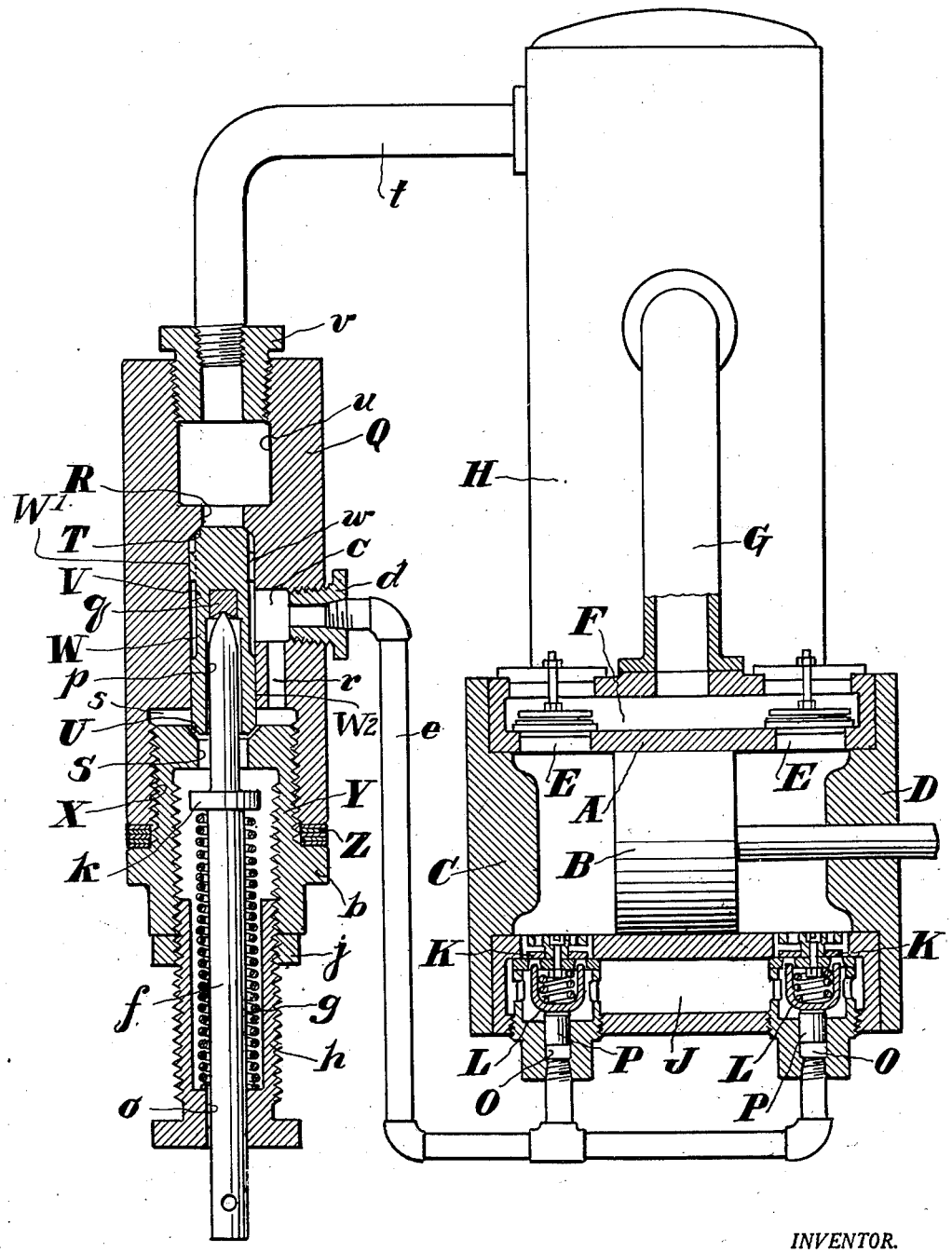

1,806,301

UNITED STATES PATENT OFFICE

JOHN LE VALLEY, OF PAINTED POST, NEW YORK, ASSIGNOR TO INGERSOLL-RAND COMPANY, OF JERSEY CITY, NEW JERSEY, A CORPORATION OF NEW JERSEY

PRESSURE CONTROLLED VALVE

Application filed January 14, 1928. Serial No. 246,792.

This invention relates to pressure controlled valves and more particularly that type of valve which is adapted to be opened by the pressure of motive fluid at a critical maximum pressure and closed upon decrease of the pressure of motive fluid to a predetermined minimum.

The invention is a modification of the type of valve disclosed in J. H. Castle and W. D. Rogers, No. 1,138,278 of May 4, 1915, and its object is to enable the valve to be closed and opened more positively.

The type of valve herein described is of general application, but is of special value in connection with regulating systems for air or other gas compressors whereby the pressure is partially or completely unloaded upon the increase of its discharge pressure to a predetermined maximum and reloading of the compressor upon decrease of its discharge to a predetermined minimum.

The invention accordingly relates to certain features of construction in combination which contribute to more positive action of the valve at the critical pressures as are pointed out in the following specification and the appended claim.

Other objects and advantages will be in part obvious and in part pointed out hereinafter.

The drawing shows in vertical longitudinal section a valve constructed in accordance with the practice of the invention and associated with a compressor provided with unloading mechanism.

Referring to the drawing, the invention is shown in combination with a compressor comprising a cylinder A having a reciprocating piston B and suitable back and front heads C and D respectively. The discharge from the compressor is adapted to pass out through suitable check valves E into a discharge chamber F and thence through a pipe G to a reservoir H of any suitable construction. The air or other gas to be compressed is drawn into the cylinder A through an inlet chamber J provided with inlet valves K which are adapted to be actuated automatically by pressure differential. In this instance the loading and unloading of the cylinder is accomplished by a pair of spiders L which are adapted to press the inlet valves K from their seats, thereby preventing pressure from accumulating to any material extent within the cylinder A. The spiders L are actuated by the compressed air from the reservoir H introduced into unloader cylinders O within which are provided plungers P preferably formed integrally with the spiders L.

The invention provides means for supplying compressed air to the unloader cylinders O when the discharge pressure exceeds a predetermined maximum in the reservoir H and for discharging the compressed air from the cylinders O when the pressure in the reservoir H drops below a predetermined minimum.

To this end there is provided a pressure controlled valve comprising a valve chest Q having an inlet opening R and an exhaust opening S preferably in alignment with each other and provided with valve seats T and U respectively. A cylindrical bore V connects the two seats T and U and forms a guide for a cylindrical valve W movable in the bore and adapted at its ends to close the valve seats T and U respectively preventing the flow of motive fluid through the bore V to the discharge seat U. The valve W is in the form of a plug having peripheral guiding surfaces W' and W² adjacent its upper and lower ends respectively which cooperate slidably with the wall of the bore V to maintain the ends of the valve in substantial alignment with the valve seats T and U. The discharge seat U may be adjustable longitudinally with respect to the inlet passage seat T to vary the travel of the valve for extending or reducing the range in pressure between the maximum and minimum receiver pressures at which the valve is intended to act. To this end the valve chest Q is provided with a threaded bore X of relatively large diameter to receive a hollow plug Y having at its inner end the seat U. The seats T and U are preferably held in the relative positions to which they may be adjusted by suitable shims Z inserted between a shoulder $b$ and the end of the valve chest body Q. Intermediate the seats T and U there is provided a port $c$ which is adapted to be connected by means of a bushing $d$ and the piping $e$ to the unloader cylinders O and to convey motive fluid such as compressed air from the reservoir H to the unloader cylinders.

If the valve W is off its seat T compressed air is adapted to flow through restricted openings $w$ in the valve W and preferably in its outer surface part way along its length to the port $c$. Normally the valve W is held to its seat T by means of a plunger $f$ pressed by means of a spring $g$ against the valve W with a pressure exceeding that pressure to which the valve W is exposed at the inlet opening R. Tensioning of the spring $g$ is effected by means of a plug $h$ hollowed to receive the spring $g$ and threaded into the plug $b$, the plug $h$ being held in position by a jamb nut $j$. The spring $g$ is adapted to bear against a collar $k$ on the plunger $f$. The plunger $f$ is adapted to extend through the end of the plug $h$ there being provided a bore $o$ of slightly larger size than the plunger to permit the restricted escape of air from the discharge opening S to atmosphere.

In this instance the valve W is hollow for part of its length as at $p$ to receive the end of the plunger $f$ and a bearing block $q$ is provided to prevent excessive wear of the point of the plunger against the valve W.

The discharge of compressed air from the pipe $e$ is accomplished through a by-pass passage $r$ leading from the port $c$ to a chamber $s$ adjacent the discharge passage seat U.

The compressed air is conducted to the inlet passage R through a pipe $t$ leading from the discharge reservoir H to a chamber $u$ in the valve chest Q adjacent the inlet opening R there being a suitable pipe bushing $v$ provided threaded into the chamber $u$.

In operation normally the valve W is held to its seat T closing the inlet opening R by the pressure of the spring $g$ holding the plunger $f$ against the valve W. The pressure area on the end of the valve W is substantially the area of the inlet opening R since any air leaking by the seat T finds its way to atmosphere through the restricted openings $w$, the port $c$, the by-pass passage $r$ and the discharge opening S to atmosphere through the bore $o$. If the pressure exceeds a predetermined maximum in the reservoir H the pressure of the spring $g$ is overcome pressing the valve W from its seat, thereby increasing the pressure area of the end of the valve and causing the valve to be accelerated to close the discharge seat U. Compressed air then finds its way past the restricted opening $w$ into the port $c$ and thence to the unloader cylinders O. The plungers P cause the spiders L to lift the valves K from their seats, thereby unloading the compressor.

The valve seat U is made larger than the valve seat T so that when the valve W is held against the seat U the pressure area against which the pressure of the motive fluid acts is greater than the pressure area which is substantially the area of the inlet opening R which causes the initial actuation of the valve W.

If the pressure in the reservoir H drops below a predetermined minimum the tension of the spring $g$ overcomes the pressure of the motive fluid acting against the large area of the seat U starting the valve W from its seat U. Due to the large area of the seat U and the restriction of the bore $o$ the compressed air stored up in the pipe $e$ and the cylinders O assists the spring $g$ to snap the valve W to its seat T. Likewise any compressed air passing the restricted openings $w$ in the valve W assists in maintaining the throwing pressure effective against the lower end of the valve W. The by-pass passage $r$ is larger than the combined area of the restricted openings $w$ to permit the compressed air to be discharged past the seat U more readily than it enters at the openings $w$.

Because the area of the seat U is larger than the area of the inlet seat T the valve W is held positively in its open position to permit the inlet of compressed air and likewise upon the starting of the valve W from its seat U the valve is moved more quickly and effectively to the inlet seat T.

Thus by the above construction are accomplished, among others, the objects hereinbefore referred to.

I claim:

A pressure controlled valve comprising a valve chest having an inlet opening therein, a port in the valve chest for supplying pressure fluid to an element intended to be controlled, a bore in the valve chest having a seat at one end, a hollow plug threaded into the valve chest and having a valve seat arranged coaxially with the bore, an outlet opening in the plug, a valve in the form of a plug movable in said bore and cooperating with the first said seat to prevent the flow of pressure fluid through said bore to the outlet opening, peripheral guiding surfaces adjacent the ends of the valve and cooperating slidably with the bore to maintain the valve in coaxial alignment with the valve seats, spring means for holding said valve in position to close the inlet opening, restricted openings in said valve to convey pressure fluid from said inlet opening to the port, a by-pass passage of large area as compared to said restricted openings and leading from said port to the seat in the plug, and shims between the plug and the valve chest for adjusting the valve seats with respect to each other to vary the travel of the valve and thus also vary the range between pressures at which the valve is actuated.

In testimony whereof I have signed this specification.

JOHN LE VALLEY.